United States Patent [19]

Eijkelenboom

[11] 4,171,833
[45] Oct. 23, 1979

[54] BALL COUPLING FOR PIPINGS

[75] Inventor: Gerrit Eijkelenboom, Sliedrecht, Netherlands

[73] Assignees: Van de Graaf's Werktuig- en Constructiebouw B.V., Zwijndrecht; Baggermaatschappij Bos & Kalis B.V., Papendrecht, both of Netherlands

[21] Appl. No.: 862,322

[22] Filed: Dec. 20, 1977

[30] Foreign Application Priority Data

Jan. 28, 1977 [NL] Netherlands .......................... 7700901

[51] Int. Cl.² ............................................ F16L 27/04
[52] U.S. Cl. ..................................... 285/261; 285/320
[58] Field of Search ................................ 285/261–271, 285/420, 91, 320, 321, DIG. 21, 308; 403/143, 141, 316, 330

[56] References Cited

U.S. PATENT DOCUMENTS

| | | | |
|---|---|---|---|
| 1,957,805 | 5/1934 | Rich | 285/261 X |
| 3,181,901 | 5/1965 | Watts | 285/91 X |
| 3,661,409 | 5/1972 | Brown et al. | 285/367 X |
| 4,035,006 | 7/1977 | Isoyama | 285/420 X |
| 4,079,970 | 3/1978 | Brett | 285/367 X |

FOREIGN PATENT DOCUMENTS

| | | | |
|---|---|---|---|
| 572584 | 3/1933 | Fed. Rep. of Germany | 285/261 |
| 2600058 | 8/1976 | Fed. Rep. of Germany | 285/261 |
| 54475 | 4/1943 | Netherlands | 289/91 |

*Primary Examiner*—Dave W. Arola
*Attorney, Agent, or Firm*—Ladas, Parry, Von Gehr, Goldsmith & Deschamps

[57] ABSTRACT

A ball coupling for reliable connecting and releasing floating pipings of mud ships and the like nautical applications, mainly consisting of an outer ball a hollow inner ball, and a retaining member, has according to the invention been improved by embodying the retaining member in the form of pivotable ring segments which are located in a space which is delimited by flanges positioned perpendicular to the center line of the outer ball. Hereby it is achieved that the retaining means is at a fixed place due to which coupling and uncoupling of pipings can be executed much easier and quicker.

5 Claims, 2 Drawing Figures

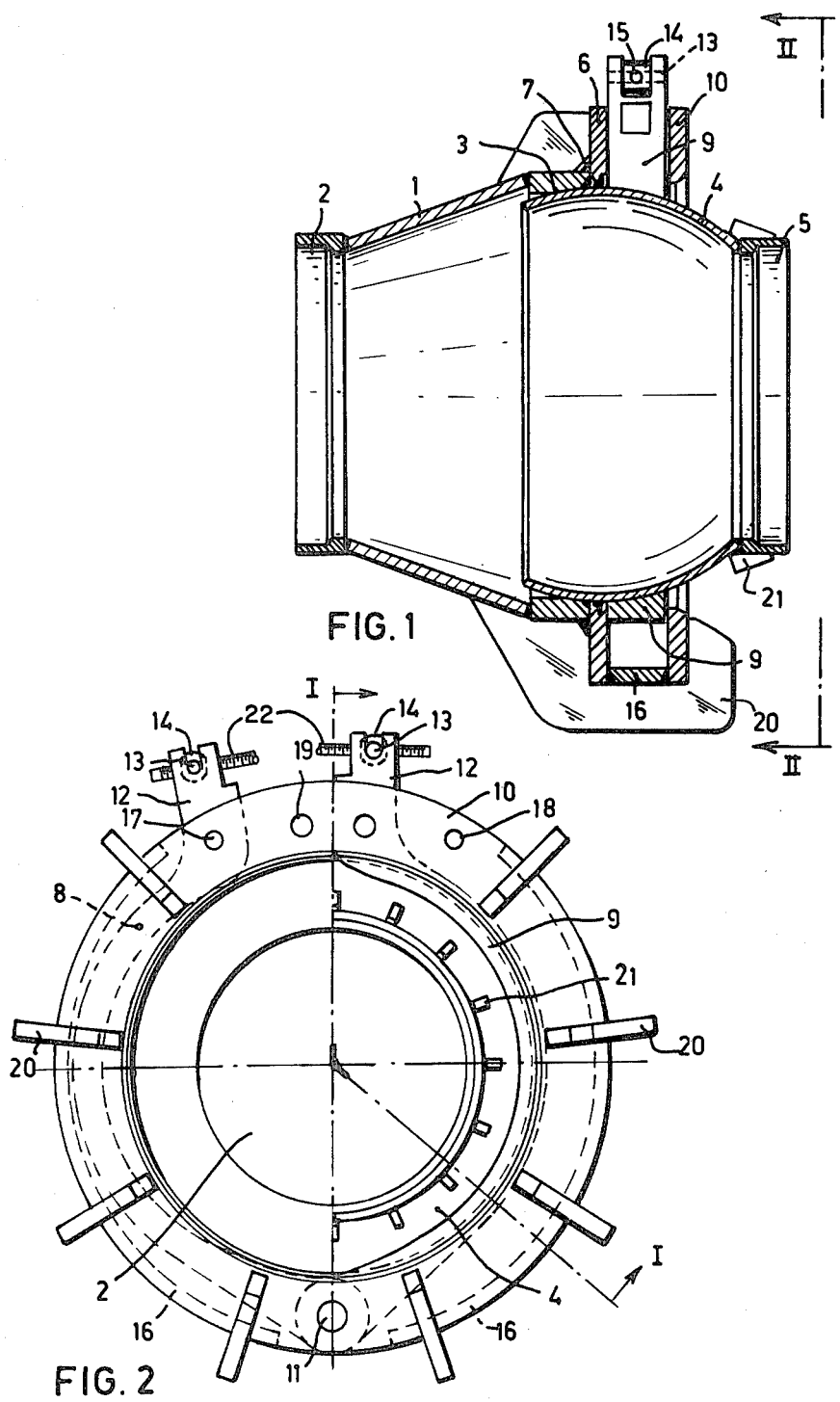

BALL COUPLING FOR PIPINGS

The invention relates to a ball coupling for pipings consisting of an outer ball with a connecting opening for one of the pipes and a hollow inner ball with a connecting opening for another pipe incorporated in the outer ball and a retaining member to permit coupling of the inner ball with the outer ball.

Such ball couplings are used particularly for floating pipings of mud ships and the like applications and a known ball coupling is described in Netherlands patent application 73 04238. For the coupling of the inner ball to the outer ball use is made there of a ring with projections which, by having the ring rotate, can be brought to and out of cooperation with a plurality of U-shaped channels located on the outer ball. The handling of such a ring is very complicated and time-consuming, since in case of ball couplings of the kind in question flow openings are concerned having a diameter which often is more than one meter which entails high weights of the total coupling, and, consequently also of the ring in question.

The invention aims at eliminating the above-mentioned problem. This is achieved according to the invention because the retaining means consists of pivotable ring segments which, preferably form together a substantially complete pressure ring. These ring segments may be present in a space which is delimited by flanges positioned perpendicular to the center line of the outer ball and connected therewith. In a particularly efficaceous embodiment the two pivotable ring segments are connected by one and the same shaft with the flanges of the outer ball. In this way it has been achieved that the retaining means is on a fixed place on the ball coupling due to which operation, when coupling and decoupling pipings, can be quicker and more efficaceous.

In an efficaceous embodiment the free ends of the annular segments are provided with members to close and open the retaining means. These members may comprise a coupling nut. Furthermore, it is very efficaceous, when the ring segments have a hole, that holes are made in the flanges of the outer ball in such a way that the ring segments can be locked in the closed and open positions by the insertion of pins.

The invention will be further elucidated herebelow by way of the drawing in which, by way of example, an embodiment of a ball coupling according to the invention is represented. In the drawing:

FIG. 1 shows a section on the line I—I of FIG. 2 through a ball coupling according to the invention and FIG. 2 shows a side view in the direction of the arrows II—II of FIG. 1, the condition without the inner ball being represented at the left hand side of the vertical center line and the one with the inner ball at the right hand side.

The ball coupling represented in the drawing has a hollow ball casing 1 which, at one end, is provided with a connecting opening 2 for a (not represented) piping. The inner wall of the ball casing has a spherical part 3 forming the surface of a strip of a sphere.

An inner ball 4 rotatable about its center extends into the ball casing 1 and touches the spherically shaped part 3 thereof, the inner ball being provided with a connecting opening 5 for another piping (not represented).

The ball casing has a first flange 6 with a peripheral groove in which, in order to prevent leakage, a sealing 7 is located. Because of the fact that the largest diameter of the outer wall of the inner ball 4 is somewhat smaller than the inner diameter of the first flange 6 the inner ball 4 can be introduced into the ball casing 1 or removed therefrom, e.g., by means of navigating. For the coupling use now is made of two ring segments 8 and 9 which are positioned between the first flange 6 and a second flange 10 located indirectly, and in a way further to be elucidated, on the outer ball. In the embodiment represented the ring segments 8 and 9 have a common point of rotation in the shape of a journal 11 (FIG. 2) which has been inserted into and is fixed in corresponding bores (not represented) of both flanges.

At this end turned away from the points of rotation the segments 8 and 9 have a cross-shaped recess in heads 12 bent beyond the outer periphery of the flanges in which heads coupling nuts 14 mounted on shafts 13 are positioned. One nut 14 has a left hand and the other a right hand screw thread. Through the screw thread holes 15 (FIG. 1) a threaded rod 22 extends. By turning the rod 22 the ring segments can be moved towards each other or away from each other.

The second flange 10 is connected with the first flange 6 by means of plates 16. This provides the ring segments with a safeguarding against unintended swinging too far away from each other. In FIG. 2 the segment 8 is in contact with the plate 16 on the horizontal center line. As an additional locking also a hole 17 is located in the segments through which a (not represented) pin can be inserted locking the segments in the opened position (at the left in FIG. 2) by extending also through holes 18 in the flanges or in the closed position (at the right in FIG. 2) by extending also through holes 19 in the flanges which are closer to the vertical center line than the holes 18.

A ball coupling with an outer diameter of the inner ball of 1325 mm has a total own weight of about 5500 kg and, inter alia, for constructive reasons it then is desirable to position a plurality of reinforcing plates. The flanges 8 and 10 of the ball casing there are completed by fins 20 and the inner ball 4 is connected by fins 21 with the material of the other connecting opening 5.

By the scope of the claims also other embodiments than represented in the drawing are comprised.

What is claimed is:

1. A ball coupling for pipes comprising a ball member having a connecting opening for a pipe and also having a second opening, and a socket member having a connecting opening for a pipe and also having a second opening whereby the ball member may be inserted into the socket member, so that in use fluid can flow from the connecting opening of the ball member to the connecting opening of the socket member by way of the interior of the ball member, the second opening of the ball member, the interior of the socket member, and the coupling further comprising first and second flanges secured to the socket member and defining therebetween an annular space bounding the second opening of the socket member, and a retaining ring positioned in said annular space and having an open condition in which it permits the ball member to be inserted into and removed from the second opening of the socket member and a closed condition in which it locks the ball member in position in the socket member, said retaining ring comprising at least two ring segments which are pivotally connected together by a pin which is itself secured to the socket member, the first flange being directly secured to the socket member at a position bounding the second opening of the socket member and the second flange being connected to the socket member through the first flange and a plurality of connecting plates provided at the outer periphery of said annular space, thereby limiting pivotal movement of the ring segments away from each other.

2. A ball coupling according to claim 1, wherein each of the ring segments is formed with a hole and holes are formed in the first and second flanges, and the coupling further comprises locking pins which can be inserted through the holes to lock the retaining ring in its closed or open condition.

3. A ball coupling according to claim 1, wherein the retaining ring comprises only two ring segments which together form a substantially complete ring, and wherein said pin connecting the ring segments together is fixedly secured to the socket member, extending through the first and second flanges.

4. A ball coupling for pipes comprising a ball member having a connecting opening for a pipe and also having a secnd opening, and a socket member having a connecting opening for a pipe and also having a second opeing whereby the ball member may be inserted into the socket member, so that in use fluid can flow from the connecting opening of the ball member to the connecting opening of the socket member by way of the interior of the ball member, the second opening of the ball member, and the interior of the socket member, and the coupling further comprising first and second flanges secured to the socket member and defining therebetween an annular space bounding the second opening of the socket member, and a retaining ring positioned in said annular space and having an open condition in which it permits the ball member to be inserted into and removed from the second opening of the socket member and a closed condition in which it locks the ball member in position in the socket member, said retaining ring comprising at least two ring segments which are pivotally connected together by a pin which is itself secured to the socket member, and each of the ring segments being formed with a hole and holes being formed in the first and second flanges, and the coupling further comprising locking pins which can be inserted through the holes to lock the retaining ring in its closed or open condition.

5. A ball coupling according to claim 4, wherein the retaining ring comprises only two ring segments which together form a substantially complete ring, and wherein the pin connecting the ring segments together is fixedly secured to the socket member, extending through the first and second flanges.

* * * * *